(12) United States Patent
Lee et al.

(10) Patent No.: US 9,760,339 B2
(45) Date of Patent: Sep. 12, 2017

(54) APPARATUS AND METHOD OF PROCESSING NUMERIC CALCULATION

(71) Applicant: Samsung Electronics Co., Ltd., Suwon-si, Gyeonggi-do (KR)

(72) Inventors: Jong-hun Lee, Suwon-si (KR); Young-su Moon, Seoul (KR); Jung-uk Cho, Hwaseong-si (KR); Yong-min Tai, Hwaseong-si (KR); Do-hyung Kim, Hwaseong-si (KR); Si-hwa Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 219 days.

(21) Appl. No.: 14/328,865

(22) Filed: Jul. 11, 2014

(65) Prior Publication Data

US 2015/0100612 A1    Apr. 9, 2015

(30) Foreign Application Priority Data

Oct. 8, 2013    (KR) .................. 10-2013-0120194

(51) Int. Cl.
*G06F 7/38* (2006.01)
*G06F 7/535* (2006.01)
*G06F 7/499* (2006.01)

(52) U.S. Cl.
CPC ............ *G06F 7/38* (2013.01); *G06F 7/49936* (2013.01); *G06F 7/535* (2013.01); *G06F 2207/5354* (2013.01); *G06F 2207/5356* (2013.01)

(58) Field of Classification Search
CPC .......... G06F 7/53; G06F 7/535; G06F 7/5356
See application file for complete search history.

(56) References Cited

U.S. PATENT DOCUMENTS

| 5,020,017 A | * | 5/1991 | Ooms | G06F 7/535 708/650 |
|---|---|---|---|---|
| 7,801,386 B2 | | 9/2010 | Maurer | |
| 2005/0027775 A1 | * | 2/2005 | Harrison | G06F 7/535 708/650 |
| 2008/0118173 A1 | | 5/2008 | Maurer | |
| 2012/0066283 A1 | * | 3/2012 | Cho | G06F 7/535 708/650 |
| 2012/0166512 A1 | * | 6/2012 | Wong | G06F 7/535 708/650 |
| 2014/0222884 A1 | * | 8/2014 | Gupta | G06F 7/535 708/650 |

* cited by examiner

*Primary Examiner* — Chuong D Ngo
(74) *Attorney, Agent, or Firm* — Staas & Halsey LLP

(57) ABSTRACT

A method and apparatus for processing numeric calculation are provided. The method includes determining a shift bit and an index bit that falls within an index range of a lookup table from among bits representing a divisor scaled up by an offset, obtaining a replacement value corresponding to an index value of the determined index bit by using the lookup table, multiplying a dividend scaled up by the offset by the obtained replacement value, and outputting a value corresponding to a division operation by correcting a scale of a result of the multiplication using a right shift operation.

6 Claims, 9 Drawing Sheets

- M = 3, N = 8, range = (0, 8]

- $\dfrac{127}{11} = 127 \cdot \dfrac{1}{11/2^S} \cdot \dfrac{1}{2^S} = \left(127 \cdot \dfrac{2^N}{11/2^S}\right) \cdot \dfrac{1}{2^{N-S}}$ 1. Determine shift bit and index bits
   → S = 1
   → Since logic value of index bits (M) is "101", index = 5

2. Multiply dividend by replacement value (index=5)
   → 127 X 51 = 6477

3. Right shift operation (N + S)
   → z = 6477 ≫ (8 + 1) = 12

<look-up table>

| index | 1/x' |
|-------|------|
| 1 | 256 |
| 2 | 128 |
| 3 | 85 |
| 4 | 64 |
| 5 | 51 |
| 6 | 43 |
| 7 | 37 |
| 8 | 32 |

$\dfrac{1}{x'} = \dfrac{2^N}{\text{index}}$

- M = 4, N = 8, range = (0, 8]

$$\frac{127}{11} = 127 \cdot \frac{1}{11/2^S} \cdot \frac{1}{2^S} = \left(127 \cdot \frac{2^N}{11/2^S}\right) \cdot \frac{1}{2^{N+S}}$$

1. Determine shift bit and index bits
   → S = 0
   → Since logic value of index bits (M) is "1011", index = 11

2. Multiply dividend by replacement value (index=11)
   → 127 × 23 = 2921

3. Right shift operation (N + S)
   → z = 2921 ≫ (8 + 0) = 11

<look-up table> — 520

| index | 1/x' |
|---|---|
| 1 | 256 |
| 2 | 128 |
| 3 | 85 |
| 4 | 64 |
| 5 | 51 |
| 6 | 42 |
| 7 | 36 |
| 8 | 32 |
| 9 | 28 |
| 10 | 25 |
| 11 | 23 |
| 12 | 21 |
| 13 | 19 |
| 14 | 18 |
| 15 | 17 |
| 16 | 16 |

$$\frac{1}{x'} = \frac{2^N}{index}$$

n bits (n=16)

11 = 0 0 0 0 0 0 0 0 0 0 0 0 1 0 1 1 — 510

MSB

```
for(count=0; count<iteration; count++)
{
        result[count] = dividend / divider_start + count);
{
```
910

```
for(count=0; count<iteration; count++)
{
        divider = divider_start + count;

shm = 32 - (_l_intr_s_lzd_w(divider) + M);
        shm = _l_intr_s_max_w(shm, 0);
        index = ((divider + (divider >> N)) >> shm) & bitmask;

result[count] = (dividend * LUT[index-1]) >> (offset + shm);
}
```
920

FIG. 10

START

DETERMINE SHIFT BIT AND INDEX BITS THAT FALL WITHIN INDEX RANGE OF LOOKUP TABLE FROM AMONG BITS REPRESENTING DIVISOR SCALED UP BY OFFSET — 1010

OBTAIN REPLACEMENT VALUE CORRESPONDING TO INDEX VALUE OF DETERMINED INDEX BIT BY USING LOOKUP TABLE — 1020

MULTIPLY DIVIDEND SCALED UP BY OFFSET BY OBTAINED REPLACEMENT VALUE — 1030

OUTPUT VALUE CORRESPONDING TO DIVISION OPERATION BY CORRECTING SCALE OF MULTIPLICATION RESULT BY USING RIGHT SHIFT OPERATION TO OUTPUT VALUE CORRESPONDING TO DIVISION OPERATION — 1040

END

APPARATUS AND METHOD OF PROCESSING NUMERIC CALCULATION

CROSS-REFERENCE TO RELATED APPLICATIONS

This application is related to, and claims the priority benefit of, Korean Patent Application No. 10-2013-0120194, filed on Oct. 8, 2013, in the Korean Intellectual Property Office, the disclosure of which is incorporated herein in its entirety by reference.

BACKGROUND

1. Field

One or more embodiments relate to an apparatus and method of processing a numeric calculation, and more particularly, to an apparatus and method of processing a numeric calculation by using emulation of a division operation.

2. Description of the Related Art

In computing devices, a division operation is used for various purposes. For example, in an image filtering operation of a computing device, a division operation is needed for processing of numeric data such as calculation of an inverse matrix for a minimum mean-squared error (MMSE).

In an application that does not need precise calculation, such as a multimedia processing application, an operation for a floating point may be transformed into an integer operation to speed up the operation and save hardware resources. A division operation for integers usually requires the most complex hardware design among the four fundamental operations and, when implemented with hardware, occupies a majority of a hardware area.

Therefore, to efficiently use the processing capability of a computing device, a method and apparatus that minimize a performance of a division operation or perform another operation in place of the division operation are desired.

SUMMARY

Additional aspects and/or advantages will be set forth in part in the description which follows and, in part, will be apparent from the description, or may be learned by practice of the invention.

One or more embodiments include an apparatus and method of processing a numeric calculation.

One or more embodiments include a non-transitory computer-readable recording medium having recorded thereon a program for executing the method on a computer.

Additional aspects will be set forth in part in the description which follows and, in part, will be apparent from the description, or may be learned by practice of the presented embodiments.

According to one or more embodiments, a method for processing a numeric calculation with a processor includes determining a shift bit and an index bit that falls within an index range of a lookup table from among bits representing a divisor scaled up by an offset with the processor, obtaining a replacement value corresponding to an index value of the determined index bit by using the lookup table, multiplying a dividend scaled up by the offset by the obtained replacement value, and outputting a value corresponding to a division operation by correcting a scale of a result of the multiplication using a right shift operation.

The determining of the shift bit and the index bit may include determining the shift bit and the index bit based on a position of a most significant bit (MSB) having a logic value of 1 from among the bits representing the divisor.

The determining of the shift bit and the index bit may include using at least one of a count leading zeros (CLZ) instruction, a leading zero count (LZCNT) instruction, a bit scan reverse (BSR) instruction, and an onefind command to count the number of bits having 0 from an MSB of a register.

The lookup table may include mapping information between $2^M$ indices and replacement values obtained by adjusting scales of the respective indices.

The determining of the shift bit and the index bit may include determining M lower bits from a position of an MSB having a logic value of 1 as index bits from among the bits representing the divisor.

The determining of the shift bit and the index bit may include determining the shift bit based on the number of bits other than the M index bits among the bits representing the divisor.

The right shift operation may be performed with respect to the result of the multiplication by a sum of N and S, if the offset is $2^N$ and the number of shift bits is S.

The lookup table may include mapping information between $2^M$ indices and replacement values obtained by adjusting scales of the indices by the offset and a lower bound for the divisor, if the lower bound for the divisor is preset.

The determining of the shift bit and the index bit may include determining M lower bits from a position of a bit representing $2^L$ among the bits representing the divisor, if the lower bound is $2^L$.

The determining of the shift bit and the index bit may include determining an upper bit than the bit representing $2^L$ as a shift bit from among the bits representing the divisor.

The offset may be a value set to approximate a floating point operation to an integer operation.

According to one or more embodiments, a non-transitory computer-readable recording medium having recorded thereon a program for executing the method on a computer is provided.

According to one or more embodiments, an apparatus for processing a numeric calculation includes a bit determining unit configured to determine a shift bit and an index bit that falls within an index range of a lookup table from among bits representing a divisor scaled up by an offset with a processor, an index checking unit configured to obtain a replacement value corresponding to an index value of the determined index bit by using the lookup table, a multiplying unit configured to multiply a dividend scaled up by the offset by the obtained replacement value, and a shifting unit configured to output a value corresponding to a division operation by correcting a scale of a result of the multiplication using a right shift operation.

The bit determining unit may determine the shift bit and the index bit based on a position of a most significant bit (MSB) having a logic value of 1 from among the bits representing the divisor.

The apparatus may further include an n-bit register configured to store the divisor and the dividend and a storing unit having stored therein in advance the lookup table comprising mapping information between $2^M$ indices and replacement values obtained by adjusting scales of the respective indices.

The bit determining unit may determine M lower bits from a position of an MSB having a logic value of 1 as index bits from among the bits representing the divisor, and determine the shift bit based on the number of bits other than the M index bits among the bits representing the divisor.

The right shift operation may be performed with respect to the result of the multiplication by a sum of N and S, if the offset is $2^N$ and the number of shift bits is S.

The lookup table may include mapping information between $2^M$ indices and replacement values obtained by adjusting scales of the indices by the offset and a lower bound for the divisor, if the lower bound for the divisor is preset.

The bit determining unit may determine M lower bits from a position of a bit representing $2^L$ among the bits representing the divisor, if the lower bound is $2^L$.

The bit determining unit may determine an upper bit than the bit representing $2^L$ as a shift bit from among the bits representing the divisor.

BRIEF DESCRIPTION OF THE DRAWINGS

These and/or other aspects will become apparent and more readily appreciated from the following description of the embodiments, taken in conjunction with the accompanying drawings in which:

FIG. 9 illustrates a program code for performing a numeric calculation according to an embodiment; and FIG. 10 illustrates a method of processing a numeric calculation according to an embodiment.

DETAILED DESCRIPTION

Figure 1:
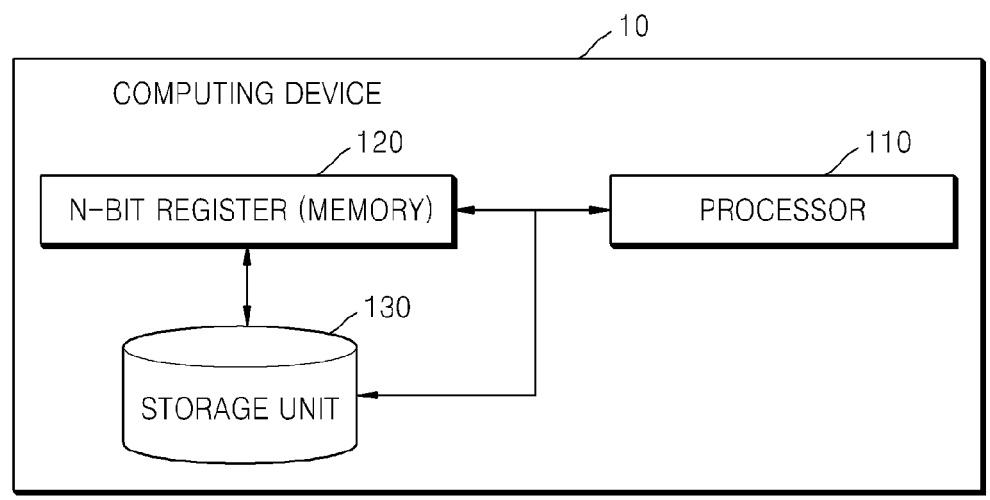
FIG. 1 illustrates a computing device according to an embodiment.

Reference will now be made in detail to embodiments, examples of which are illustrated in the accompanying drawings, wherein like reference numerals refer to like elements throughout. The embodiments are described by referring to the figures. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1 illustrates a computing device 10 according to an embodiment.

As illustrated in FIG. 1, the computing device 10 may include a processor 110, for example, a microprocessor, an n-bit register (memory) 120, and a storage unit 130. In FIG. 1, the computing device 10 is illustrated to include components related to an exemplary embodiment. Hence, those of ordinary skill in the art will understand that other general-purpose components than the components illustrated in FIG. 1 may be further included in the computing device 10.

The computing device 10 may be, but not limited to, a portable mobile device (for example, a smart phone, a tablet device, or the like), a computer (for example, a personal computer (PC), a laptop, or the like), or an embedded device.

The processor 110 may be, but not limited to, a central processing unit (CPU), a graphics processing unit (GPU), or a re-configurable processor having a plurality of function units (FUs) optimized for parallel operations.

When numeric data of an integer type is processed, a floating point operation may be performed at the same time. In a multimedia processing application, processing such as image filtering that needs an operation of voluminous numeric data may be performed. For accurate calculation of image filtering, the floating point operation may be required. However, the floating point operation may require a longer processing time than an integer operation. To support a floating point operation, more hardware (H/W) resources are required for hardware designing than for an integer operation.

In multimedia processing that needs processing of voluminous numeric data, methods have been attempted to perform an integer operation in place of a floating point operation for fast processing.

For example, floating point multiplication may be replaced with multiplying a value having a floating point by a predefined offset and performing a shift operation.

However, a division operation may not be replaceable with the foregoing simple method. This is because the shift operation may be performed only when a divisor or divider is an integer and at the same time, a multiplier of 2. Even when the division operation is emulated using software, the processing speed is very low. Furthermore, with a conventionally known method of emulating the division operation by using a Taylor series or a lookup table, processing may not be possible or fast processing may not be guaranteed if a divisor is not fixed. Since in practice, a divisor is not fixed in most division operations for multimedia processing, conventional methods of emulating the division operation have limitations.

However, a computing device 10 according to an exemplary embodiment may secure a high processing speed and a high-quality numeric calculation result, even when performing a floating point operation for various divisors, for example, a division operation for a floating point.

Figure 2:
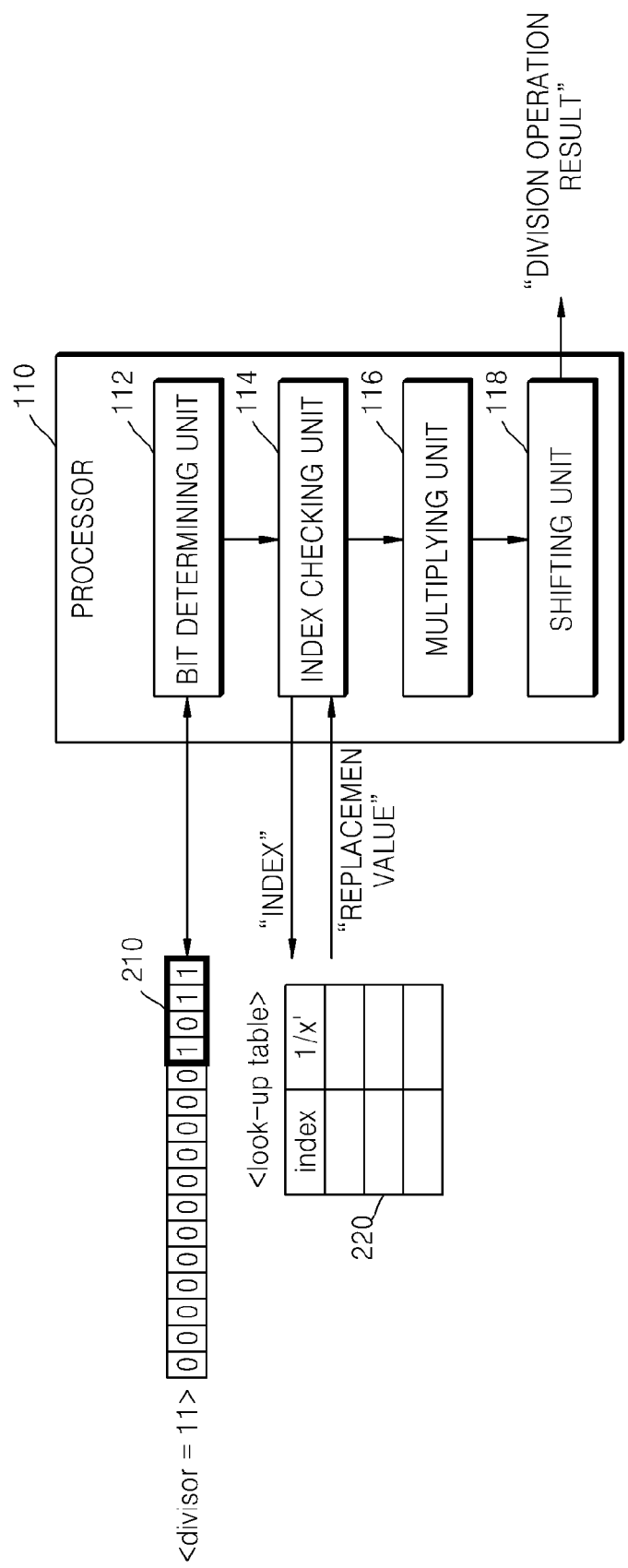
FIG. 2 illustrates a processor according to an embodiment.

FIG. 2 illustrates a processor 110 according to an embodiment.

As illustrated in FIG. 2, the processor 110 may include a bit determining unit 112, an index checking unit 114, a multiplying unit 116, and a shifting unit 118. One of ordinary skill in the art will understand that other general-purpose components than the components illustrated in FIG. 2 may also be further included in the processor 110.

Exemplary operations and functions of the computing device 10 for processing numeric calculation are described by referring to FIGS. 1 and 2.

The processor 110 performs numeric calculation of emulating a division operation of a dividend and a divisor. That is, the processor 110 performs numeric calculation for outputting a value that is approximate to a result of an actual division operation of the dividend and the divisor.

The storage unit 130 stores numeric data to be processed by the processor 110. The numeric data may include values for various purposes, such as pixel values of an image to be used for image filtering, values of voice signals to be used for voice filtering, or values of wireless communication signals received from outside during wireless communication of the computing device 10.

The storage unit 130 stores, for example, in advance a lookup table 220 to be used for numeric calculation of the processor 110.

The lookup table 220 includes mapping information between $2^M$ indices and replacement values that are obtained by adjusting scales of the indices by a predetermined offset. Herein, the predetermined offset may be a preset value for approximating a floating point operation to an integer operation.

The bit determining unit 112 reads a divisor for which numeric calculation is to be performed from the storage unit 130 and stores the read divisor in the n-bit register 120. If the divisor to be numeric-calculated has a floating point, the bit determining unit 112 scales up the divisor by a predetermined offset and stores the scaled-up divisor in the n-bit register 120.

The bit determining unit 112 determines index bits that fall within an index range $2^M$ of the lookup table 220 and shift bits among bits 210 stored in the n-bit register 120 to indicate the divisor scaled up by the offset.

The bit determining unit 112 determines the shift bits and the index bits based on a position of a most significant bit (MSB) having a logic value "1" among the bits 210 representing the scaled-up divisor.

The bit determining unit 112 may use a count leading zeros (CLZ) instruction, a leading zero count (LZCNT) instruction, a bit scan reverse (BSR) instruction, or an onefind instruction for counting the number of bits having a logic value "0" from the MSB of the n-bit register 120 to determine the shift bits and the index bits. An exemplary method includes counting a number of bits having "0" from the MSB.

For example, as illustrated in FIG. 2, the n-bit register 120 has 16 bits, such that the bit determining unit 112 counts 12 bits having "0" from the MSB by using the CLZ instruction, thereby determining that the logic value "1" is first set in a $13^{th}$-bit position from the MSB.

The bit determining unit 112 determines M lower bits from the MSB having "1" among the bits 210 representing the divisor as index bits. The determination of the M lower bits as the index bits originates from the index range $2^M$ of the lookup table 220.

The bit determining unit 112 determines the shift bits based on the number of other bits than the M index bits among the bits 210 representing the divisor.

For example, if M is 3, the bit determining unit 112 may determine three lower bits from the MSB among the four bits 210 representing the divisor as the index bits. Thus, the bit determining unit 112 may determine a least significant bit (LSB) among the bits 210 representing the divisor as the shift bit.

According to an embodiment, if a lower bound for the divisor is preset, the lookup table 220 stored in the storage unit 130 may include mapping information between $2^M$ indices and replacement values that are obtained by adjusting scales of the indices by the offset and the lower bound.

If the lower bound is $2^S$, the bit determining unit 112 may determine M lower bits from a bit position distant by S bits from the MSB having "1" among the bits 210 representing the divisor as the index bits. The bit determining unit 112 may determine the S bits as the shift bits.

The index checking unit 114 obtains a replacement value corresponding to an index value of the determined index bits, by using the lookup table 220 stored in advance.

The multiplying unit 116 multiplies the dividend scaled-up by the offset by the obtained replacement value.

The shifting unit 118 outputs a value corresponding to the division operation by correcting a scale of the multiplication result by using a right shift operation. The right shift operation is performed by a sum of N and S with respect to the multiplication result if an offset is $2^N$ and the number of shift bits is S.

Equation (1) provided below describes numeric calculation performed, for example, by the processor 110, $$\frac{y}{x} = \frac{y}{2^s \cdot x'} = \left(y \cdot \frac{1}{x'}\right) \gg S \qquad \text{(Equation 1)}$$

wherein y represents a dividend, x represents a divisor, S represents the number of shift bits, and $$\frac{1}{x'}$$

represents a replacement value obtained from the lookup table 220. In Equation (1), the dividend y and the divisor x are values that may not be scaled up, but if the dividend y and the divisor x are scaled up by a predetermined offset $2^N$, the right shift operation may be further performed by N.

That is, the processor 110 performs a numeric calculation that is a combination of multiplication of the dividend y by the replacement value $$\frac{1}{x'}$$

and a right shift operation of the multiplication result by S, instead of performing the division operation of $$\frac{y}{x}.$$

In other words, the processor 110 emulates the division operation with numeric calculation that is a combination of the multiply operation and the right shift operation.

Figure 3:
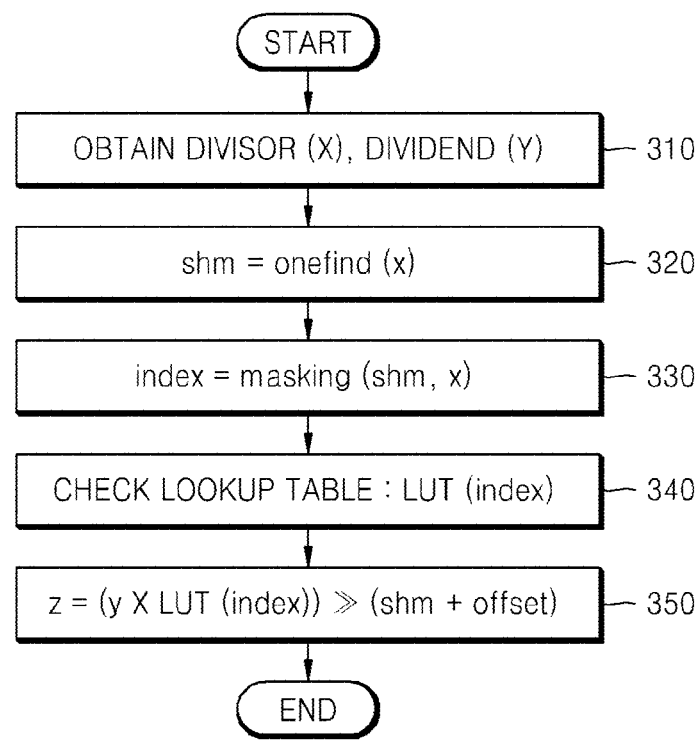
FIG. 3 illustrates a method of processing a numeric calculation in a processor according to an embodiment.

FIG. 3 illustrates a method of processing numeric calculation by a processor 110 according to an embodiment. As illustrated in FIG. 3, a method of processing numeric calculation according to an embodiment is a process performed in time series by a computing device 10 and a processor 110, as illustrated, for example, in FIGS. 1 and 2.

In operation 310, the bit determining unit 112, for example, obtains the dividend y and the divisor x for which numeric calculation is to be performed from the storage unit 130. Herein, the divisor x may be stored in the n-bit register 120. The bit determining unit 112 may scale up the divisor x by the predetermined offset if the divisor x for which numeric calculation is to be performed has a floating point.

In operation 320, the bit determining unit 112, for example, determines shift bits "shm" and index bits for the divisor x stored in the n-bit register 120, for example, by using the CLZ instruction, the LZCNT instruction, the BSR instruction, and/or the onefind instruction.

In operation 330, the bit determining unit 112, for example, performs bit-masking with respect to the determined shift bits "shm" and index bits by using a masking instruction for a bit-mask, thereby determining an index value corresponding to logic values of the index bits.

In operation 340, the index checking unit 114, for example, obtains a replacement value corresponding to the determined index values, by using the lookup table 220 stored in advance.

In operation 350, the multiplying unit 116, for example, multiplies the dividend scaled up by the offset by the obtained replacement value. The shifting unit 118, for example, then corrects a scale of the multiplication result by using a right shift operation (shm+offset) to output a value z corresponding to the division operation.

Figure 4:
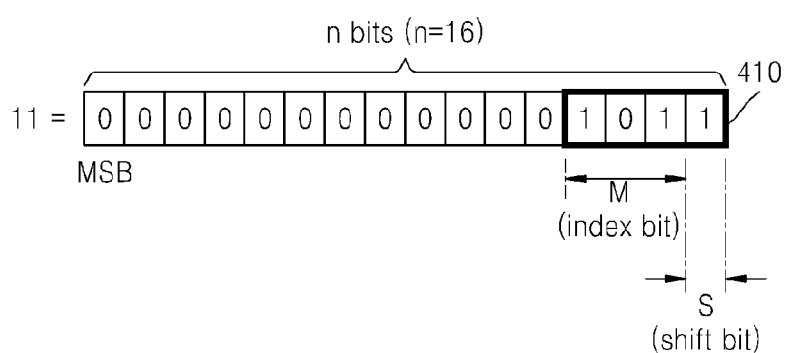
FIG. 4 illustrates a process of performing a numeric calculation in a computing device according to an embodiment.

FIG. 4 illustrates a process of performing numeric calculation by a computing device 10 according to an embodiment.

As illustrated in FIG. 4, the computing device 10 performs a numeric calculation that is a combination of a multiply operation and a right shift operation, instead of a division operation, for example, of $$\frac{127}{11}.$$

The storage unit 130 stores in advance a lookup table 420 having an index range, for example, of $2^M=8$ (=23). Since the index range is $2^M=8$, the number of index bits, M, is fixed to 3.

In the lookup table 420, indices and replacement values $$\frac{1}{x'}$$

whose scales are adjusted by an offset, for example, $2^N=256$ (=28) are mapped to each other. In the lookup table 420, an index and a replacement value $$\frac{1}{x'}$$

may have a relationship of Equation (2) provided below.

$$\frac{1}{x'} = \frac{2^N}{\text{index}} \quad \text{(Equation 2)}$$

The computing device 10 performs numeric calculation as in Equation (3), instead of the division operation of $$\frac{127}{11}.$$

Herein, the divisor is 11 and the dividend is 127. The divisor and the dividend are values scaled up by the offset $2^8$.

$$z = 127 \cdot \frac{1}{11/2^S} \cdot \frac{1}{2^S} = \left(127 \cdot \frac{2^N}{11/2^S}\right) \cdot \frac{1}{2^{N+S}}, \quad \text{(Equation 3)}$$

wherein S represents the number of shift bits and N represents an exponent of an offset value.

The bit determining unit 112 counts the number of bits having "0" from the MSB by using the CLZ instruction or the onefind instruction to determine shift bits and index bits. The bit determining unit 112 determines bits 410 representing a divisor based on the count result.

The bit determining unit 112 determines, as index bits, 3 (M=3) lower bits from the MSB among the bits 410 representing the divisor. The bit determining unit 112 then determines the shift bits based on the number of other bits than the three index bits among the bits 410 representing the divisor. In FIG. 4, the number of shift bits is 1 and thus S is 1.

The bit determining unit 112 determines an index value of logic values of the three index bits. In FIG. 4, the logic values of the three index bits are "101" and thus an index value is 5.

The index checking unit 114 obtains a replacement value of 51 corresponding to the determined index value of 5, by using the lookup table 420.

The multiplying unit 116 multiplies the dividend of 127 by the replacement value of 51, thus obtaining a multiplication result of 6477.

The shifting unit 118 performs a right shift operation by a sum of an exponent of the offset, N, for example, of 8, and the number of shift bits, S, for example, of 1, that is, by 9 with respect to the multiplication result of 6477, thereby scaling down the multiplication result of 6477.

The shifting unit 118 outputs z=12 as a result of 6477>> (8+1).

Since a real value of the division operation of $$\frac{127}{11}$$

is 11.5454, it is approximate to the numeric calculation result z=12 output from the shifting unit 118. Thus, the computing device 10 may obtain a result approximate to a result of the actual division operation of $$\frac{127}{11}$$

by performing numeric calculation that is a combination of a multiply operation and a right shift operation with reference to the lookup table 420 stored in advance.

Figure 5:
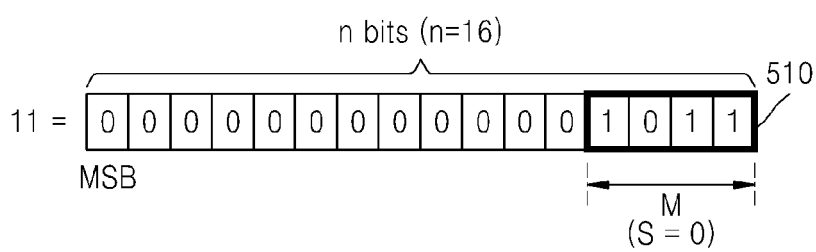
FIG. 5 illustrates a process of performing a numeric calculation in a computing device by using a lookup table having an index range ($2^M$=16) that is different from that in FIG. 4, according to an embodiment.

FIG. 5 illustrates a process of performing numeric calculation in the computing device 10 by using a lookup table 520 having an index range ($2^M=16$) that is different from that of FIG. 4, according to an embodiment.

The index range $2^M$ of the lookup table 420 is 8 (=$2^3$) in FIG. 4, but the index range $2^M$ of the lookup table 520 is 16 (=$2^4$) in FIG. 5, such that M in FIG. 5 increases from that in FIG. 4.

Unlike in FIG. 4, in FIG. 5, the number of index bits, M, is 4, such that the number of shift bits, S, is 0. Thus, the bit determining unit 112 determines an index value to be 11.

The index checking unit 114 obtains a replacement value of 23 corresponding to the determined index value of 11 by using the lookup table 520.

The multiplying unit 116 multiplies the dividend of 127 by the replacement value of 23, thus obtaining the multiplication result of 2921.

The shifting unit 118 performs a right shift operation with respect to the multiplication result of 2921 by a sum of an exponent of an offset, N, of 8 and the number of shift bits, S, of 0, thereby scaling down the multiplication result of 2921.

The shifting unit 118 outputs z=11 as a result of 2921>>(8+0).

When compared to the lookup table 420 of FIG. 4, the index range $2^M$ of the lookup table 520 of FIG. 5 is extended, thereby obtaining the value z=11, which is closer to the actual result of the division operation of $$\frac{127}{11}.$$

However, the lookup table 520 of FIG. 5 needs a larger storage size than that of the lookup table 420 of FIG. 4. Thus, it can be seen that the storage sizes based on the index ranges $2^M$ of the lookup tables 420 and 520 and the accuracy of numeric calculation have a trade-off relationship.

Figure 6:
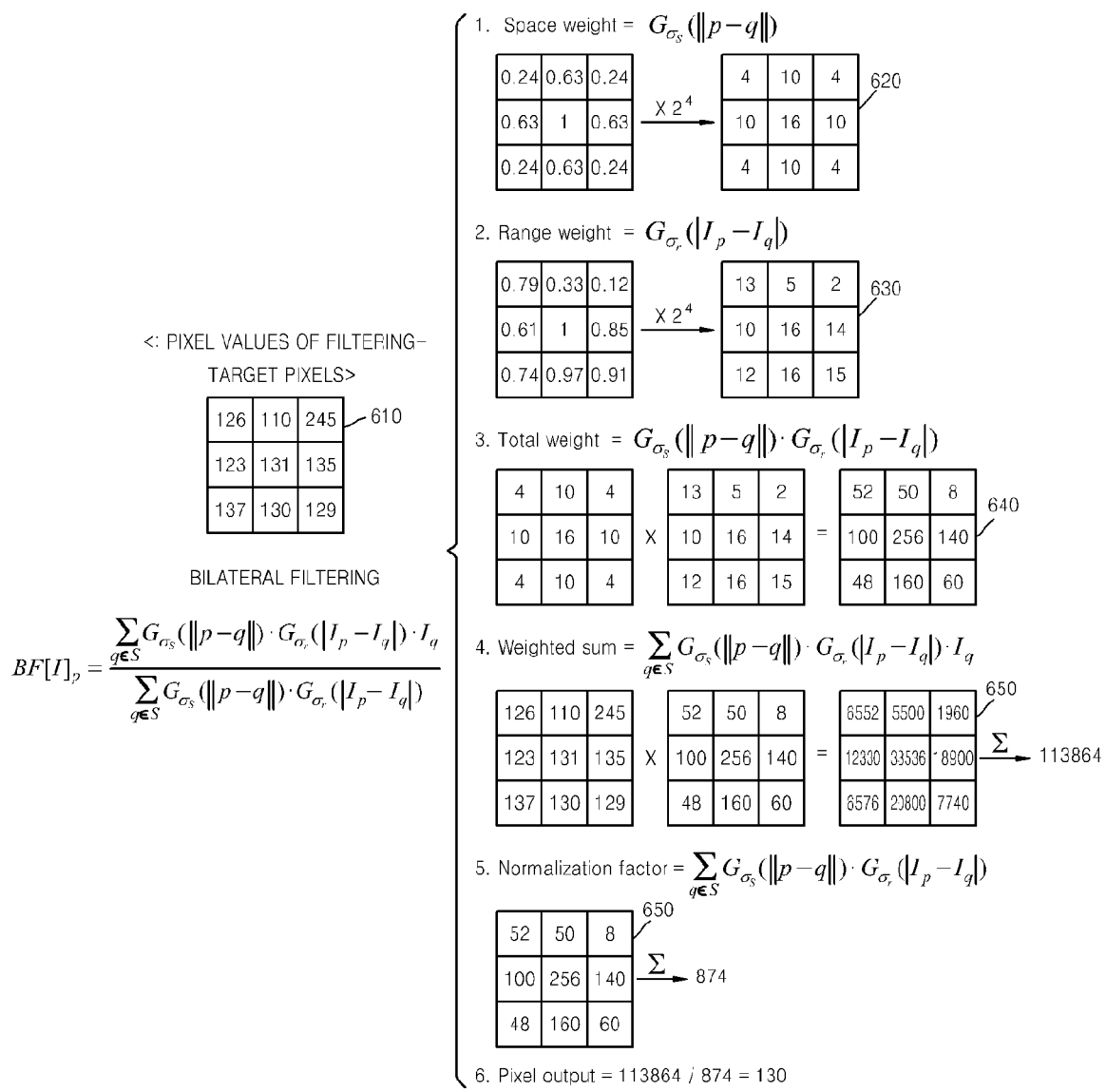
FIG. 6 illustrates bilateral filtering for an image according to an embodiment.

FIG. 6 illustrates bilateral filtering for an image according to an embodiment.

As illustrated in FIG. 6, bilateral filtering may be performed using Equation (4).

$$BF[I]_p = \frac{\sum_{q \in S} G_{\sigma_s}(\|p-q\|) \cdot G_{\sigma_r}(|I_p - I_q|) \cdot I_q}{\sum_{q \in S} G_{\sigma_s}(\|p-q\|) \cdot G_{\sigma_r}(|I_p - I_q|)} \quad \text{(Equation 4)}$$

An exemplary embodiment may include bilateral filtering, for example, using Equation (4).

As illustrated in FIG. 6, pixel values 610 of pixels to be bilateral-filtered are illustrated.

During bilateral filtering, a space weight and a range weight for the pixel values 610 may be calculated.

Since results of calculation of the space weight and the range weight for the pixel values 610 have a floating point, a predetermined offset ($2^4$=16) for each pixel is multiplied to replace the calculation with an integer operation. Thus, a final space weight 620 and a final range weight 630 are adjusted to an integer scale.

A total weight 640 is obtained by multiplying the scaled-up final space weight by the scaled-up final range weight 630.

A weighted sum 650 is calculated based on a result of multiplication of the pixel values 610 by the total weight 640. That is, the weighted sum 650 is 113864.

The weighted sum 650 is normalized by a normalization factor 660. As illustrated in FIG. 6, the normalization factor 660 is 874.

In this way, 130 is output as an output value of the bilateral filtering with respect to the pixel values 610.

To obtain the output value of the bilateral filtering, 30, illustrated in FIG. 6, a division operation of the weighted sum 650 of 113864, and the normalization factor 660 of 874 is needed.

Figure 7:
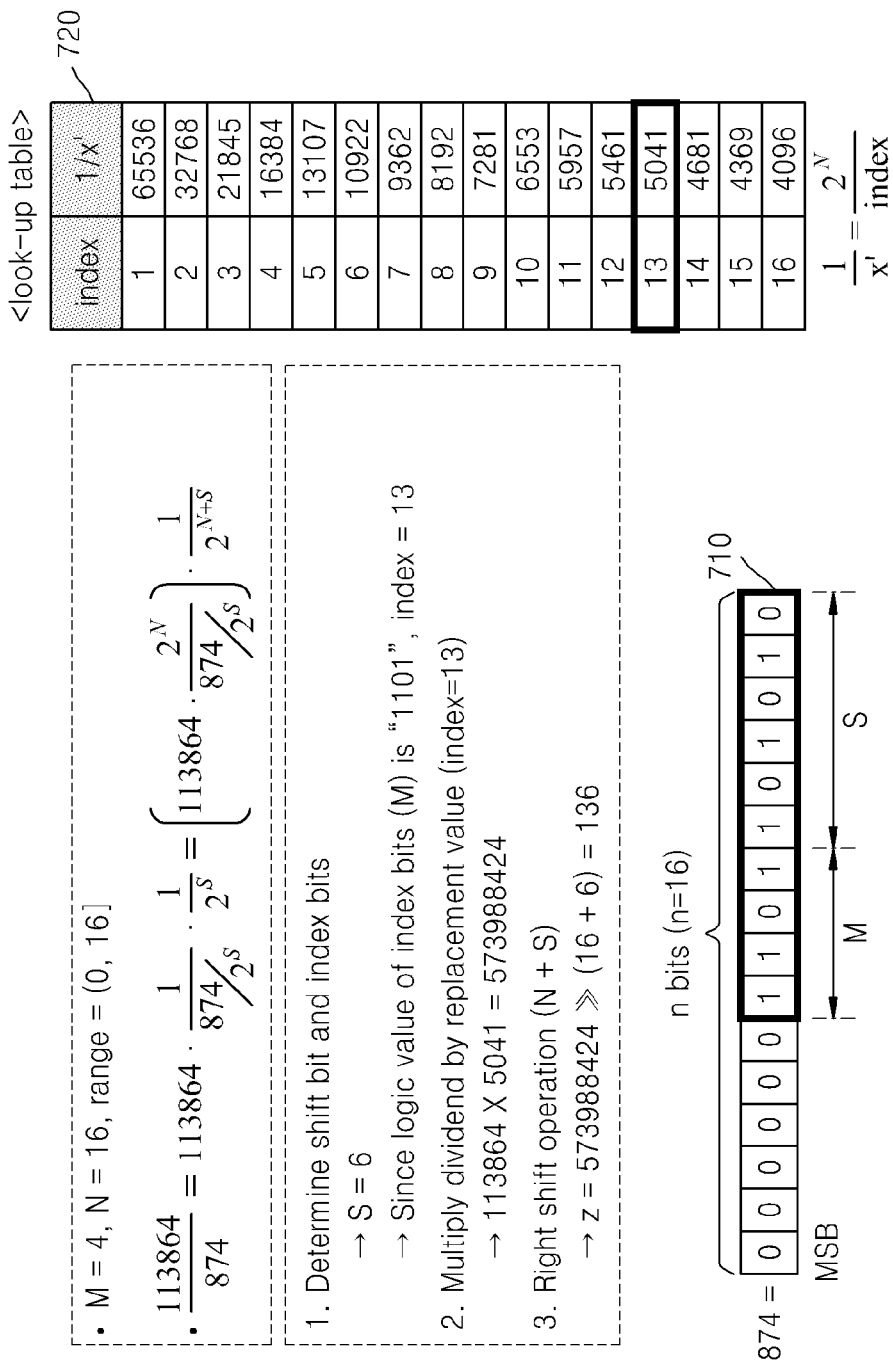
FIG. 7 illustrates a process of performing a numeric calculation in a computing device by using a lookup table to obtain an output value of the bilateral filtering of FIG. 6, according to an embodiment.
Figure 8:
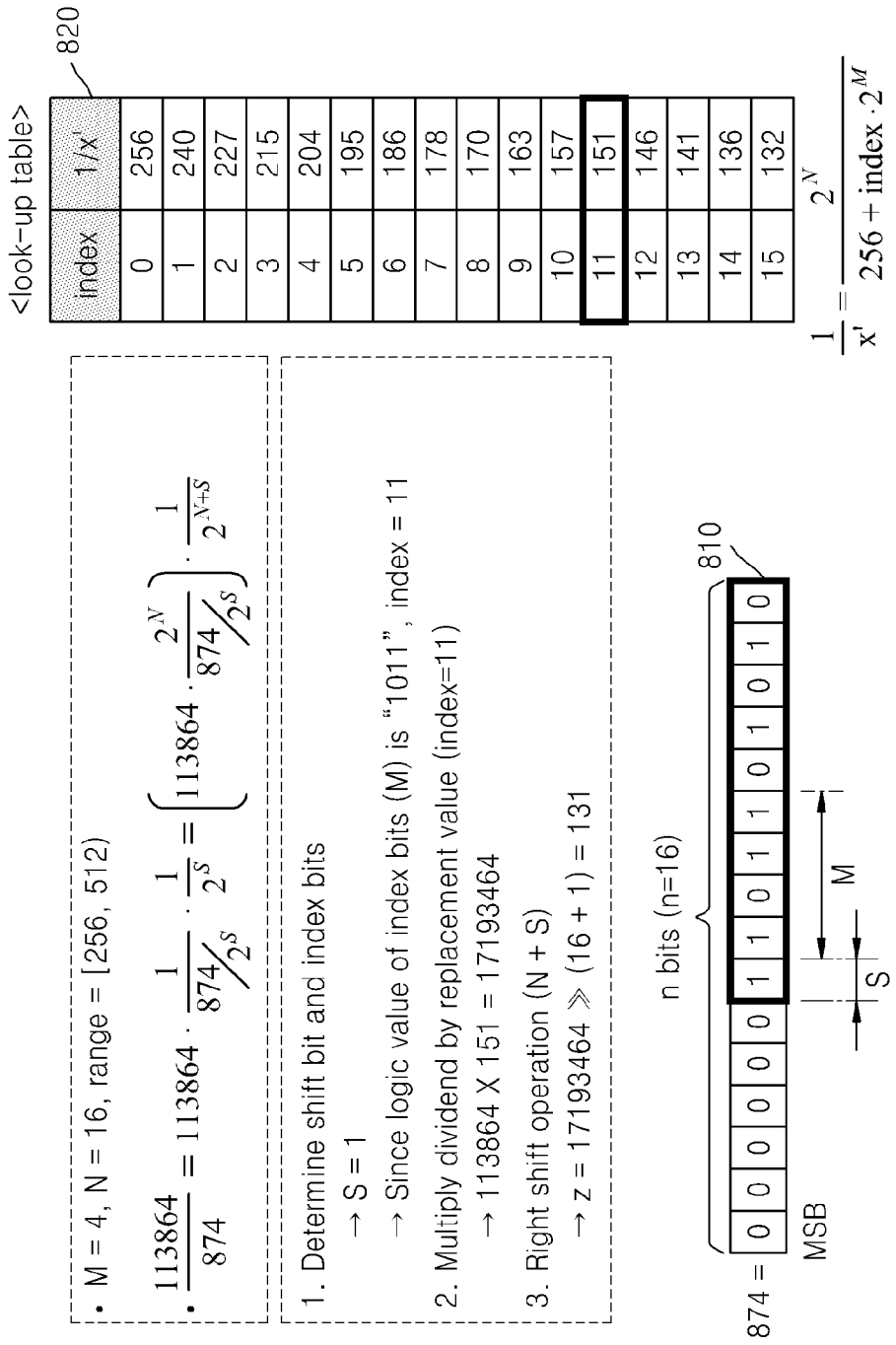
FIG. 8 illustrates a process of performing a numeric calculation in a computing device by using a lookup table to obtain an output value of the bilateral filtering of FIG. 6, according to an embodiment.

As illustrated in FIGS. 7 and 8, a method is illustrated for processing numeric calculation with respect to the weighted sum 650 and the normalization factor 660 to obtain the output value of the bilateral filtering, 130, of FIG. 6 in the computing device 10.

FIG. 7 illustrates a process of performing numeric calculation in the computing device 10 by using a lookup table 720 to obtain an output value of the bilateral filtering of FIG. 6, according to an embodiment.

As illustrated in FIG. 7, a weighted sum is a dividend that is 113864 and a normalization factor is a divisor that is 874.

The computing device 10 obtains an output value of bilateral filtering, instead of a division operation of the weighted sum of 113864 and the normalization factor of 874, by using numeric calculation described with reference to FIGS. 4 and 5.

The storage unit 130 stores in advance the lookup table 720 set by an index range $2^M$ of 16 (=$2^4$) and an offset $2^N$ of 65536 (=$2^{16}$). Since the index range $2^M$ is 16, the number of index bits, M, is fixed to 4. The lookup table 720 is set by the offset $2^N$ of 65536 (=$2^{16}$) because the final space weight 620 and the final range weight 630 are scaled up by 16 times in FIG. 6.

According to numeric calculation described with reference to FIGS. 4 and 5, the bit determining unit 112 determines the number of shift bits, S, to be 6 and determines an index value to be 13, by using bits 710 representing a divisor.

The index checking unit 114 obtains a replacement value of 5041 corresponding to the determined index value of 13 by using the lookup table 720.

The multiplying unit 116 multiplies the dividend of 113864 by the replacement value of 5041, thus obtaining a multiplication result of 573988424.

The shifting unit 118 performs a right shift operation with respect to the multiplication result of 573988424 by a sum of the exponent of the offset, N, of 16, and the number of shift bits, S, of 6, that is, by 22, thereby scaling down the multiplication result of 573988424.

The shifting unit 118 outputs z=136 as a result of 573988424>>(16+6).

Since the actual result of the division operation of $$\frac{113864}{874}$$

is 130.2791, the result of numeric calculation output from the shifting unit 118 is close to the actual result of the division operation. Thus, the computing device 10 performs numeric calculation that is a combination of the multiply operation and the right shift operation, by referring to the lookup table 720 stored in advance, thereby replacing the division operation needed for bilateral filtering.

FIG. 8 illustrates a process of performing numeric calculation in the computing device 10 by using a lookup table 820 to obtain an output value of the bilateral filtering of FIG. 6, according to an embodiment.

As illustrated in FIG. 8, the computing device 10 obtains an output value of the bilateral filtering of FIG. 6 by using numeric calculation that is different from that of FIG. 7.

Central pixels of the space weight 620 and the range weight 630 of FIG. 6 have values of 1. Thus, if the space weight 620 and the range weight 630 are scaled up by a predetermined offset ($2^4$=16), the values of the central pixels of the space weight 620 and the range weight 630 are 16 at all times, such that a value of a central pixel of a normalization factor 660 is greater than 256 (=16×16) at all times. As a result, the normalization factor 660 is greater than 256 and less than 512 at all times. In other words, a lower bound of a divisor is 256 (=$2^L$).

Hence, unlike the lookup table 720 of FIG. 7, the lookup table 820 of FIG. 8 may include indices and replacement values that have a relationship expressed by Equation (5). The lookup table 820 is stored in advance in the storage unit 130.

$$\frac{1}{x'} = \frac{2^N}{256 + \text{index} \cdot 2^M} \quad \text{(Equation 5)}$$

If a lower bound is $2^L$, the bit determining unit 112 determines M lower bits from a position of a bit representing $2^L$ as index bits from among bits 810 representing a divisor. The bit determining unit 112 determines upper bits than the bit representing $2^L$ as shift bits from among the bits 810 representing the divisor.

As illustrated in FIG. 8, the normalization factor 660 has a value that is greater than 256 (=$2^8$) and less than 512(=$2^9$), such that L is 8. Thus, the bit determining unit 112 determines 4 (M=4) lower bits having a logic value of 1011 from a position of a bit representing $2^8$ as index bits from among the bits 810 representing the divisor. Thus, the bit determining unit 112 determines an index value to be 11.

The bit determining unit 112 determines a bit that has $2^9$ having a logic value of 1 and is an upper bit than a bit representing $2^8$ as a shift bit from among the bits 810 representing the divisor (an MSB of the bits 810 indicating the divisor). Consequently, the bit determining unit 112 determines the number of shift bits, S, to be 1.

The index checking unit 114 obtains a replacement value of 151 corresponding to the determined index value of 11 by using the lookup table 820.

The multiplying unit 116 multiplies the dividend of 113864 by the replacement value of 151, thus obtaining a multiplication result of 17193464.

The shifting unit 118 performs a right shift operation with respect to the multiplication result of 17193464 by a sum of the exponent of the offset value, N, of 16 and the number of shift bits, S, of 1, that is, 17, thereby scaling down the multiplication result of 17193464.

The shifting unit 118 outputs z=131 as a result of 17193464>>(16+1).

Since the actual result of the division operation of $$\frac{113864}{874}$$

is 130.2791, the result of numeric calculation output from the shifting unit 118, z=131, is close to the actual result of the division operation. Thus, the computing device 10 performs numeric calculation that is a combination of the multiply operation and the right shift operation, for example, by referring to the lookup table 820 stored in advance, thereby replacing the division operation needed for bilateral filtering.

FIG. 9 illustrates a program code 920 for performing numeric calculation according to an embodiment.

As illustrated in FIG. 9, a program code 910 for performing a division operation may be implemented using a division operator "/" as in "dividend/divider_start+count".

However, the program code 920 for performing numeric calculation that is a combination of the multiply operation and the right shift operation by referring to a lookup table (LUT), according to an embodiment may not use the division operator "/". That is, the program code 920 for emulating the division operation according to an embodiment may replace the division operator "/" merely with instructions using shift and index bits, an instruction for referring to a replacement value of the LUT, and an instruction for performing a right shift operation. In this way, a long processing time caused by the use of the division operator "/" may be reduced and the complexity of designing of hardware resources may be reduced.

The program code 920 illustrated in FIG. 9 is merely an exemplary code for performing numeric calculation according to an embodiment, and an exemplary embodiment is not limited to this example. Moreover, those of ordinary skill in the art will understand that various formats of program codes for performing numeric calculation according to an embodiment may be used in addition to the program code 920 illustrated in FIG. 9.

FIG. 10 illustrates a method of processing a numeric calculation according to an embodiment. As illustrated in FIG. 10, the method of processing numeric calculation according to an embodiment may be processed in time-series by the computing device 10 and the processor 110 illustrated in FIGS. 1 and 2.

In operation 1010, the bit determining unit 112, for example, determines a shift bit and index bits that fall within an index range of the lookup table 220 from among the bits 210 representing the divisor scaled up by an offset.

In operation 1020, the index checking unit 114, for example, obtains a replacement value corresponding to an index value of the determined index bits by using the lookup table 220.

In operation 1030, the multiplying unit 116, for example, multiplies a dividend scaled up by the offset by the obtained replacement value.

In operation 1040, the shifting unit 118, for example, corrects a scale of a multiplication result by using a right shift operation, thus outputting a value corresponding to the division operation.

An exemplary embodiment may be embodied as a program executable on a computer and may be implemented on a general-purpose digital computer that runs the program by using a non-transitory computer-readable recording medium. A structure of data used in an embodiment may be recorded on a non-transitory computer-readable recording medium by using various means. Examples of non-transitory computer-readable recording medium include storage media, such as a magnetic storage medium (for example, a read-only memory (ROM), a floppy disk, a hard disk, or the like) and an optical reading medium (for example, a compact disk (CD)-ROM, a digital versatile disk (DVD), or the like).

According to the one or more embodiments, by replacing a division operation that needs complex hardware resources with a multiply operation or a shift operation that uses simpler hardware resources, a high processing speed and a high-quality result of numeric calculation may be achieved.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments are described with reference to the figures, it will be understood by those of ordinary skill in the art that various changes in form and details may be made therein without departing from the spirit and scope of the present invention as defined by the claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method for filtering an image with a processor of a computing device, the method comprising:
receiving, at the computing device, pixel values of the image to be filtered during communication of the computing device with another device;
storing, in a memory of the computing device, the received pixel values of the image; and
processing the stored pixel values with the processor of the computing device by:
determining a weight sum of the pixel values based on filtered weights,
determining a normalization factor based on the filtered weights,
determining a shift bit and an index bit that falls within an index range of a lookup table from among bits representing the determined normalized factor,
obtaining a replacement value corresponding to an index value of the determined index bit by using the lookup table, wherein the replacement value in the lookup table is obtained by dividing an offset by the index value,
multiplying the determined weight sum by the obtained replacement value, and
outputting a filtered pixel value of the image to be used in the filtering of the image corresponding to a division operation by correcting a scale of a result of the multiplication using a right shift operation,
wherein the offset is a value set to approximate a floating point operation to an integer operation,
wherein the determining of the shift bit and the index bit comprises determining M lower bits from a position of a most significant bit (MSB) having a logic value of 1 as index bits from among the bits representing the determined normalized factor and determining the shift bit based on the number of bits other than the M index bits among the bits representing the determined normalized factor, and
wherein the right shift operation is performed by right-shifting the result of the multiplication by a sum of N and S, where the offset is $2^N$ and the number of shift bits is S.

2. The method of claim 1, wherein the determining of the shift bit and the index bit comprises using at least one of a count leading zeros (CLZ) instruction, a leading zero count (LZCNT) instruction, a hit scan reverse (BSR) instruction, and an onefind command to count the number of bits having 0 from an MSB of a register.

3. The method of claim 1, wherein the lookup table comprises mapping information between $2^M$ indices and replacement values obtained by dividing the offset by each of the indices.

4. A non-transitory computer-readable recording medium having recorded thereon a program for executing the method of claim 1 on a computer.

5. An apparatus for filtering an image, the apparatus comprising:
a receiver to receive pixel values of the image to be filtered during communication of the apparatus with another device;
a memory storing the received pixel values of the image and storing instructions; and
a processor configured to process the stored pixel values by executing the stored instructions to:
determine a weight sum of the pixel values based on filtered weights,
determine a normalization factor based on the filtered weights,
determine a shift bit and an index bit that falls within an index range of a lookup table stored by the storage of the apparatus from among bits representing the determined normalized factor,
obtain a replacement value corresponding to an index value of the determined index bit by using the lookup table stored by the memory, wherein the replacement value in the lookup table is obtained by dividing an offset by the index value,
multiply the determined weight sum scaled up by the offset by the obtained replacement value, and
output a filtered pixel value of the image to be used in the filtering of the image corresponding to a division operation by correcting a scale of a result of the multiplication using a right shift operation,
wherein the offset is a value set to approximate a floating point operation to an integer operation, wherein the processor determines M lower bits from a position of a most significant bit (MSB) having a logic value of 1 as index bits from among the bits representing the determined normalized factor, and determines the shift bit based on the number of bits other than the M index bits among the bits representing the determined normalized factor, and
wherein the processor performs the right shift operation by right-shifting the result of the multiplication by a sum of N and S, where the offset is $2^N$ and the number of shift bits is S.

6. The apparatus of claim 5, further comprising:
an n-bit register configured to store the determined normalized factor and the dividend,
wherein the memory stores in advance the lookup table comprising mapping information between $2^M$ indices and replacement values obtained by dividing the offset by each of the indices.